(12) United States Patent
Sullivan

(10) Patent No.: US 6,460,684 B1
(45) Date of Patent: Oct. 8, 2002

(54) BUMPER CARRIER AND SUPPORT

(75) Inventor: Patrick Doud Sullivan, Carpentersville, IL (US)

(73) Assignee: Wes-Tech, Inc., Buffalo Grove, IL (US)

( * ) Notice: Subject to any disclaimer, the term of this patent is extended or adjusted under 35 U.S.C. 154(b) by 0 days.

(21) Appl. No.: 09/560,165

(22) Filed: Apr. 28, 2000

(51) Int. Cl.7 .............................................. B65G 49/00
(52) U.S. Cl. ................ 198/465.1; 198/795; 198/803.01
(58) Field of Search ........................... 198/465.1, 465.2, 198/795, 867.13, 803.01

(56) References Cited

U.S. PATENT DOCUMENTS

| | | | |
|---|---|---|---|
| 2,424,055 A | 7/1947 | Rousseau | 198/127 |
| 3,049,214 A | 8/1962 | Cormia et al. | 198/19 |
| 4,220,435 A | 9/1980 | Yeskey | 414/418 |
| 4,605,121 A | 8/1986 | Wahren | 198/803.01 |
| 4,899,865 A * | 2/1990 | Keil | 198/465.12 |
| 5,002,175 A | 3/1991 | Drexel et al. | 198/345.3 |
| 5,007,527 A | 4/1991 | Ach et al. | 198/803.01 |
| 5,090,556 A | 2/1992 | Ach et al. | 198/465.1 |
| 5,143,195 A | 9/1992 | Bloecker | 198/345.3 |
| 5,170,876 A | 12/1992 | Sticht | 198/345.3 |
| 5,242,043 A | 9/1993 | Sturm | 198/345.3 |
| 5,372,240 A | 12/1994 | Weskamp | 198/465.1 |
| 6,135,266 A * | 10/2000 | Weskamp | 198/465.2 |

* cited by examiner

Primary Examiner—D. Glenn Dayoan
Assistant Examiner—Lori L Coletta
(74) Attorney, Agent, or Firm—Baker & McKenzie

(57) ABSTRACT

A buffer/brake system is provided for carriers used in an automated assembly system. The rear ends of the carriers are each equipped with a flexible ring that is compressed when an upstream carrier strikes the flexible ring. Compression of the flexible ring causes it to expand and thereby engage the sidewalls of the track and the frictional engagement of the ring against the sidewalls of the track act as a brake for the struck carrier. The ring acts to absorb the shock resulting from the collision between the queued carrier and the oncoming carrier, thereby limiting the transfer of impact forces from pallet to pallet along the track. The ring is carried by a rotatable support which has a laterally extended ring abutment surface. The rotatable ring support is able to swivel, relative to the carrier to which it is attached, as the track makes turns in the assembly system. The abutment surface and rotatable support for the ring reduce the tendency for the ring to get caught and cause jams as the carrier rounds curves in the track of the assembly system.

9 Claims, 6 Drawing Sheets

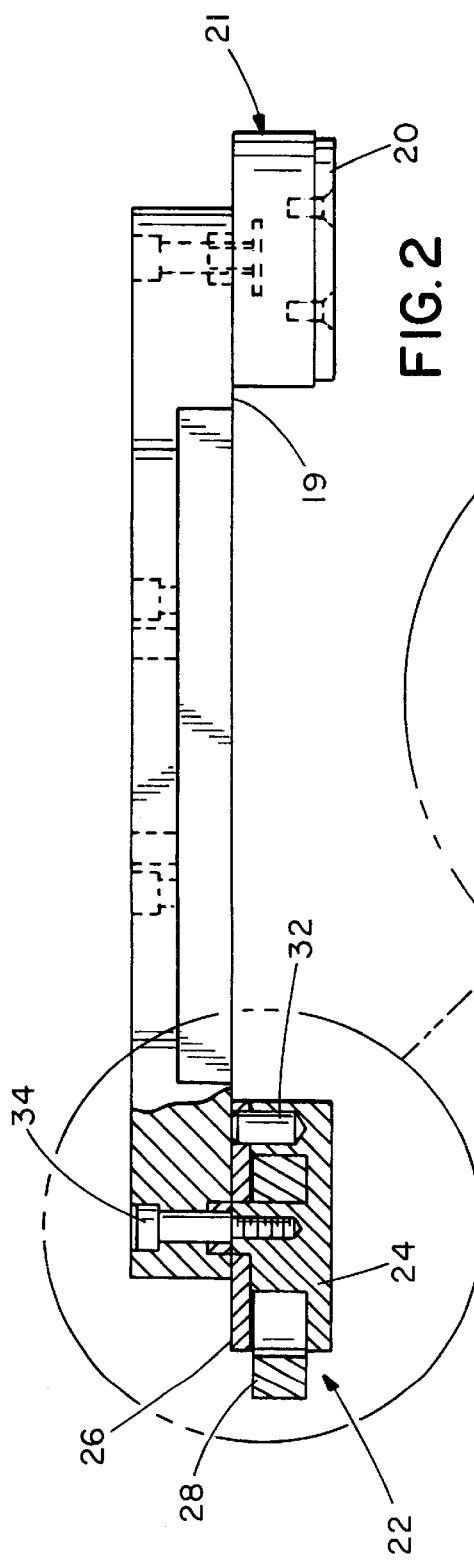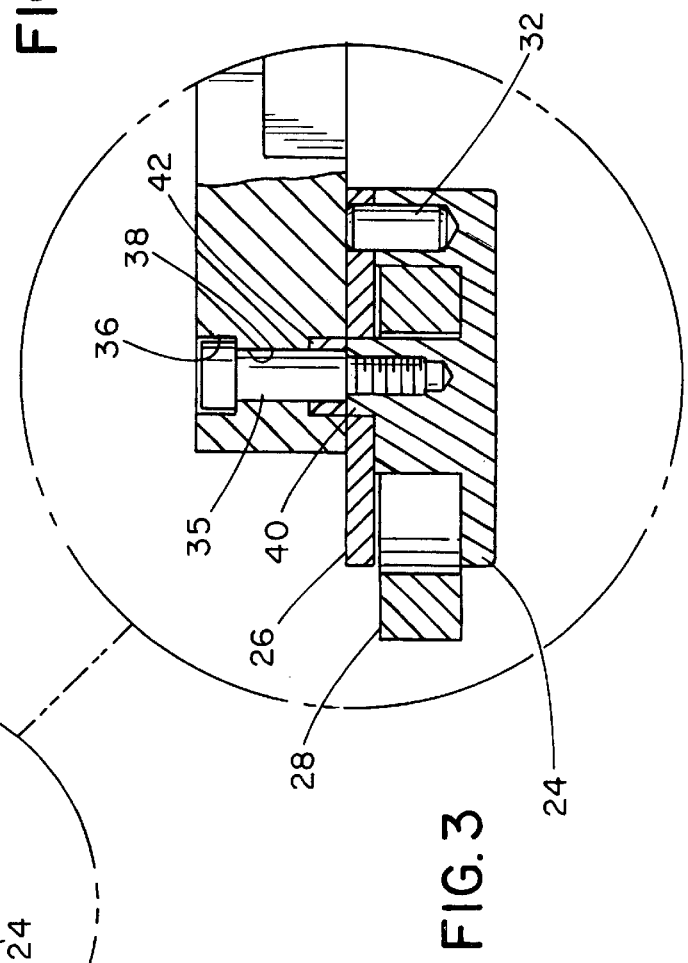

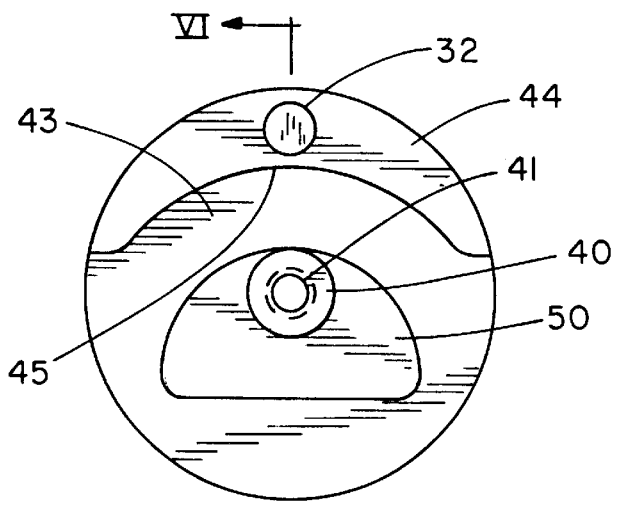
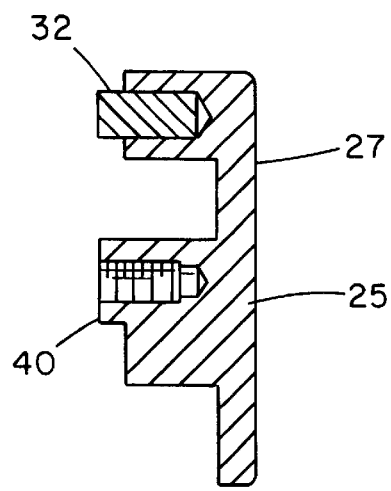
FIG. 5  FIG. 6
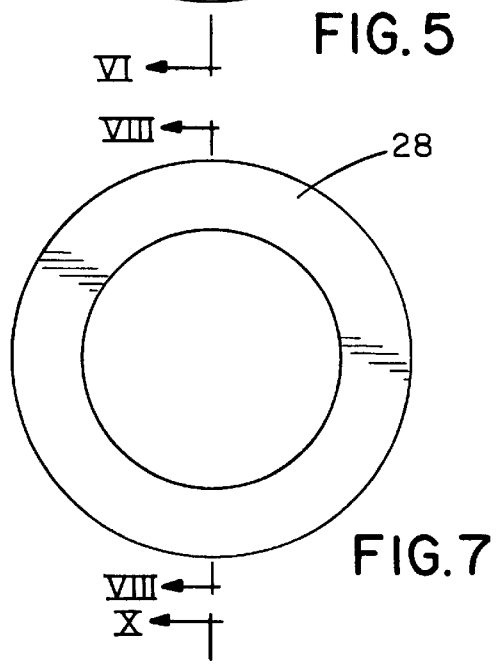
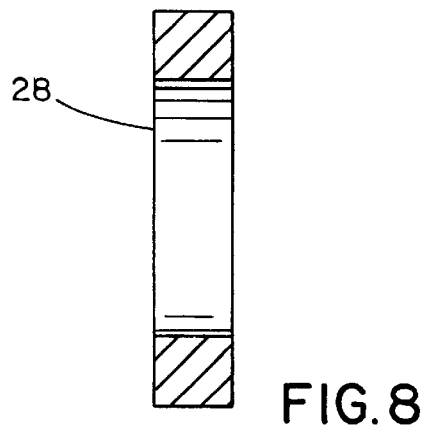
FIG. 7  FIG. 8
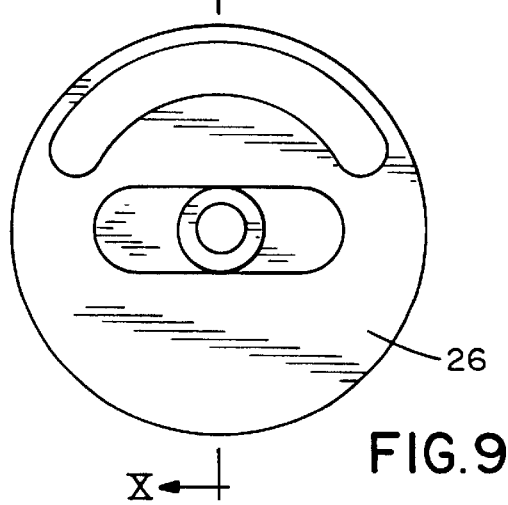
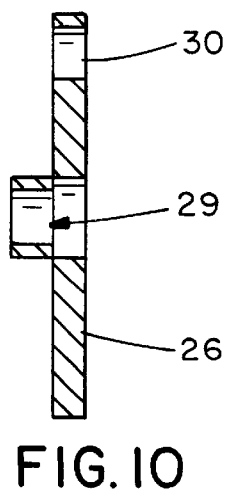
FIG. 9  FIG. 10

BUMPER CARRIER AND SUPPORT

FIELD OF THE INVENTION

This invention relates generally to conveyor systems for use in manufacturing operations such as automated assembly systems or machine tool loading operations. Improved carriers are provided with a bumper having braking capabilities to reduce shock transmitted when one moving or oncoming carrier impacts into a stationary or slowly moving queued carrier in a conveyor system. The bumper of the present invention is mounted so that it can swivel as the carrier makes a turn in a conveyor system.

BACKGROUND AND SUMMARY OF THE INVENTION

Automated conveyor systems for the assembly of products are well-known. An example of a track system in which the present invention has application is shown and described in U.S. Pat. No. 5,447,220. The present invention is directed to non-synchronous assembly systems and specifically to the problem encountered when a moving carrier impacts a stationary or queued carrier along a conveyor track. The present invention is directed to an improved system that buffers the collision between two carriers, thereby reducing shock transmitted to the products disposed on top of the carriers. The present invention includes a pivoting bumper which improves the ability of a carrier to make turns in a conveyor system without getting wedged in the event that an impact occurs when two carriers are not aligned.

Workpieces are transported by carriers from stage to stage in an assembly system which ride in a track on top of the conveyor or conveyor chain. In a synchronous assembly system, a workpiece and carrier proceed through each stage of the assembly process and do not proceed to the next stage until the remaining workpieces are also ready to proceed to the next stage (i.e., each workpiece is in synch with the other workpieces). Thus, in synchronous assembly systems, the conveyor stops after each workpiece arrives at its respective processing stage, and the stage or task that takes the greatest amount of time will limit the rate at which all other tasks or stages can be completed because the conveyor will not resume a forward motion until all the workpieces, including the workpiece at the slowest stage, are ready to proceed to the next stage.

In contrast, in non-synchronous assembly systems, the conveyor moves continuously forward. Slower tasks are performed in multiple by employing combinations of divide modules or divide sections. At a divide section, carriers are routed from the main conveyor to spurs so that the slow task may be performed on a number of workpieces on the conveyor system at the same time. Divide sections are designed to send workpieces with the slowest task completed down the conveyor at the line rate or the rate at which the main conveyor chain is moving. After a slower task is completed, the workpiece is returned to the main conveyor chain via a merge module. A slower assembly task may also be performed by physically removing the workpiece and carrier from the conveyor, performing the task, and returning the workpiece and carrier to the conveyor where the workpiece and carriers are transported by the moving conveyor to the next stage. Because the workpieces and carriers are removed from the main conveyor chain either by physical displacement or by splitting workpieces off onto divide sections, the slower tasks to be performed do not become the limiting factor in the through-put of the system.

In some situations, a series of carriers may accumulate at a work station where a task is being performed. As an oncoming carrier arrives, it will engage a stationery or slower-moving queued carrier ahead of it on the conveying line. To address this situation, a buffer stop may be employed upstream of the work station to relieve the back pressure caused by the oncoming carriers. A queue stop may also be employed to protect the carrier at the work station from being hit or struck by an oncoming carrier because collisions between carriers result in the dissipation of kinetic energy which may dislodge the workpieces disposed on the carriers as well as disrupt the task being performed at the work station.

U.S. Pat. No. 5,372,240 (hereinafter the "'240 patent") shows a conveying system upon which the present invention is an improvement. When the flexible ring in that system is engaged by an oncoming carrier, the ring is simultaneously compressed in the longitudinal (or forward-rearward) direction and expands in the lateral (or side-to-side) direction. The lateral expansion of the ring of the '240 patent causes the ring to engage the upwardly protruding sidewalls of the track section or support frame that accommodates the conveyor. The frictional engagement of the ring against the sidewalls of the track fixes the queued carrier in place; the force absorbing ability of the flexible ring, and its ability to divert shock forces outwardly toward the sidewall of the carrier support acts to brake the queued carrier as it is engaged by the oncoming carrier. Further, because the ring is flexible and resilient, the ring itself acts as a shock absorber and reduces the shock caused by the collision of the oncoming carrier with the stationary carrier and reduces the likelihood of dislodgment of workpieces from either the queued carrier or the oncoming carrier.

Depending upon the radius of the curvature in the turns of the conveyor system in the '240 patent, the bumper configuration described therein may cause the carriers to become caught or bound by one another. However, the configuration of the present invention allows the bumper to swivel and thereby greatly reduces the chance that a carrier will become jammed in the turns of a conveyor track. The swiveling motion of the support for the bumper ring helps to align the impact forces absorbed by the ring, so that there is little eccentricity associated with the forces encountered by the bumper ring.

It is therefore an advantage of the present invention to provide a carrier for use in a non-synchronous track system that is equipped with a swiveling bumper assembly.

Another advantage of the present invention is to provide a carrier that will avoid the tendency to become jammed when rounding a curve in a track system.

Yet another advantage of the present invention is to provide a carrier in which forces imparted to the rear support of a non-moving carrier are delivered generally along a longitudinal axis of such support.

BRIEF DESCRIPTION OF THE DRAWINGS

This invention is illustrated in the accompanying drawing, wherein:

FIG. 2 is a longitudinal cross-sectional view of the carrier shown in FIG. 1;

FIG. 3 is an enlarged cross-sectional view of the rear portion of the carrier shown in FIG. 1;

FIG. 5 is a top plan view of the lower portion of the puck used on the rear of a carrier of the present invention;

FIG. 6 is a sectional view of the puck shown in FIG. 5, taken along lines VI—VI of FIG. 5;

FIG. 7 is a plan view of the bumper ring used in practicing the present invention;

FIG. 8 is a cross-sectional view taken along lines VII—VII of FIG. 7;

FIG. 9 is a top plan view of the upper portion of the puck used in the rear of a carrier of the present invention;

FIG. 10 is a sectional view of the puck shown in FIG. 5, taken along lines X—X of FIG. 5.

DETAILED DESCRIPTION OF THE INVENTION

Figure 1:
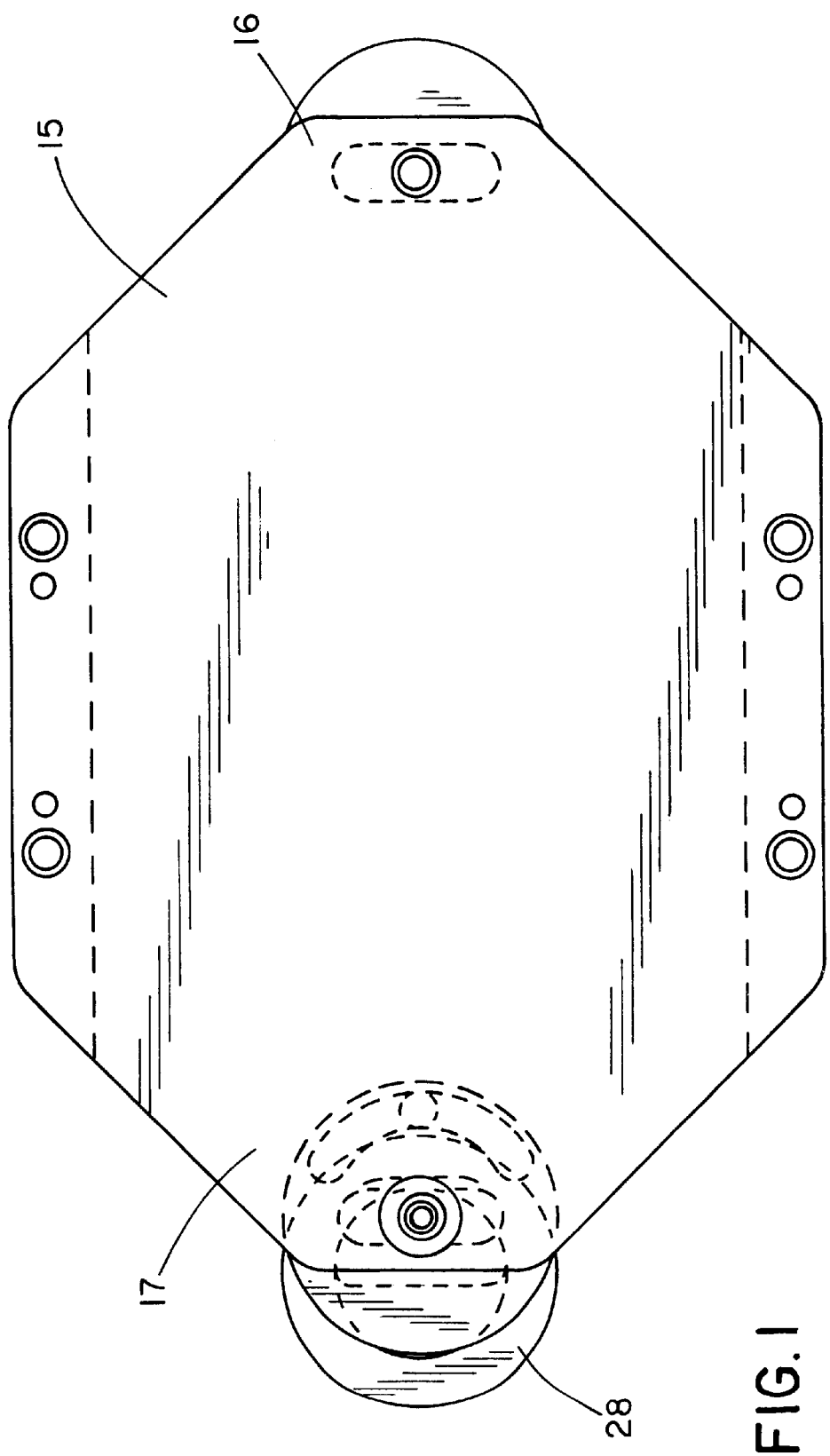
FIG. 1 is a top plan view of a carrier made in accordance with the present invention.

The same reference numerals will be used to refer to similar parts from Figure to Figure in the following description of the drawing.

FIG. 1 shows a top plan view of a pallet 15 equipped with a bumper made in accordance with the present invention. The pallet 15 has a front end 16 and a rear end 17. A ring 28 extends rearwardly from a rear carrier guide 22 attached to the rear end 17. The ring 28 is supported within a bumper support 24. An upper plate 26 is interposed between the bumper support 24 and the pallet 15. The upper plate 26, along with the bumper support 24 and the ring 28, comprise the rear carrier guide 22. The front carrier guide 21 is of conventional construction and includes a glide plate 20. The front carrier guide 21 and the rear carrier guide 22 are attached to the underside 19 of the pallet 15.

As can be best seen in FIGS. 2 and 3, the bumper support 24 carries a pin 32 which is staked into a recess formed in the upper surface of the bumper support 24. The ring 28 and the bumper support 24 are rotatable relative to the upper plate 26 in the pallet 15. The upper plate 26 is non-rotatably attached to the underside of the pallet 15. A bar 42 extending upwardly from the upper surface of the upper plate 26 fits into an oblong recess formed in the underside 19 of the pallet 15 to prevent rotation of the upper plate 26. However, the bumper support 24 and the ring 28 are rotatable together relative to the upper plate 26 and the pallet 15. A shouldered bolt 34 is threaded tightly into a threaded bore 41 formed centrally in the upper surface of the bumper support 24. The shoulder on the bolt 34 fits tightly against the upper surface of the boss 40 on the bumper support 24. However, the head of the bolt 34 fits loosely within the recess 36 formed in the upper surface of the pallet 15, so as not to limit the free rotation of the bumper support 24, the ring 28 and the bolt 34 relative to the pallet 15 and the upper plate 26. The pin 32 rotates within the slot 30, and the ends of the slot 30 provide a limit on the rotation of the bumper support 24. The length of the slot 30 is such that the bumper support 24 can rotate 60° to the right and to the left, for a total of 120° of rotation.

Figure 4:
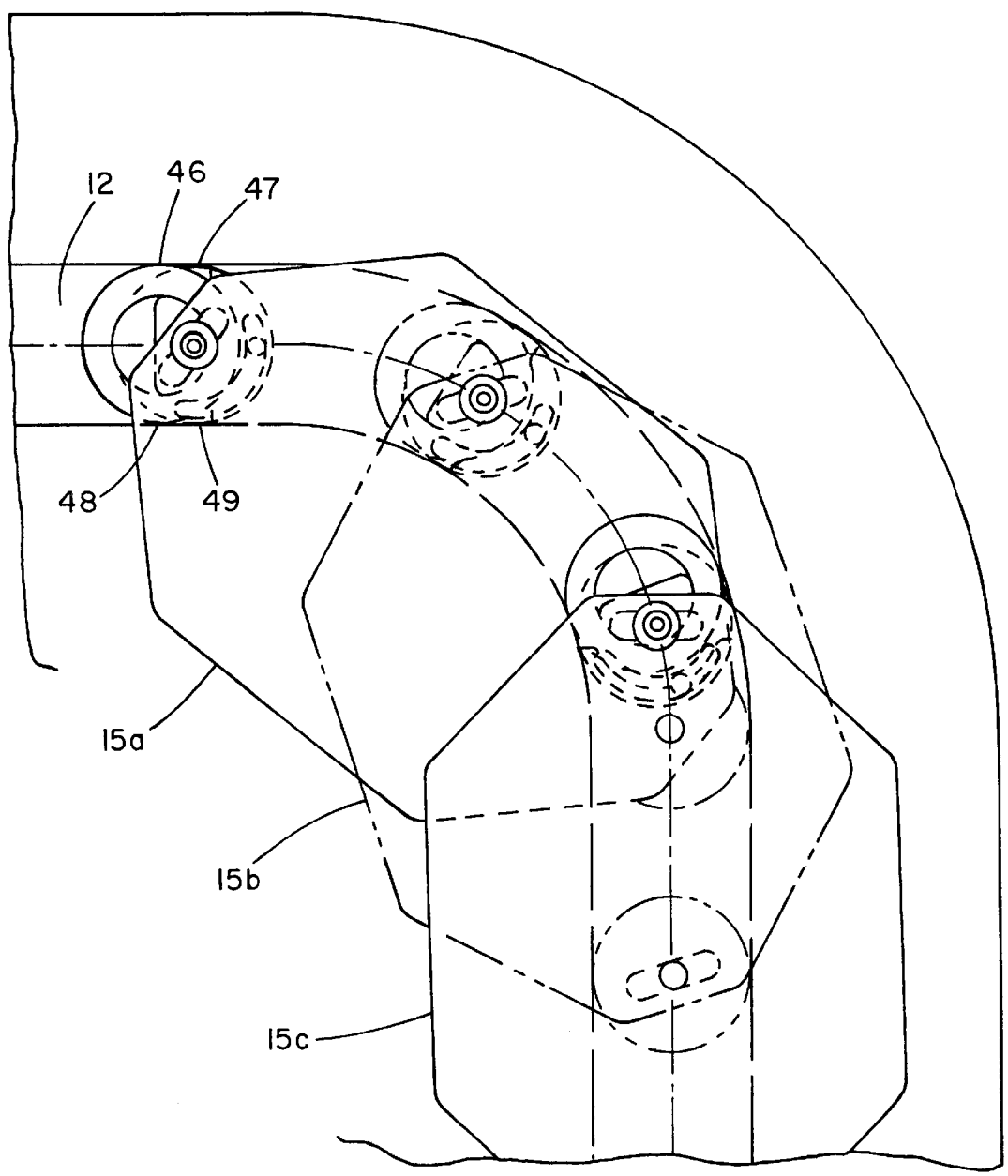
FIG. 4 is plan view of a curved section of a track showing a carrier in a plurality of positions as it makes a turn.

FIG. 4 shows the relative positions of the bumper support 24, the pin 32, and the slot 30 as a pallet 15 makes a turn in a track 12. The ring 28 and the bumper support 24 are each generally circular and equally diametrical. This results in the rear carrier guide 22 having four points of contact: 46, 47, 48 and 49; two points of contact being made by the ring 28 (i.e., points 46 and 48); while two other points of contact, 47 and 49, being made by the outside edge of the bumper support 24. As shown in FIG. 4, the position of the pallet 15a is one in which the front of the pallet has progressed to a position where the pallet is approximately 45° relative to the straight portion of the track at the top of FIG. 4. It should be noted that when the pallet is in the position of pallet 15a, the ring 28 and bumper support 24 are in the same position as they would be if the pallet had not yet begun to turn in the track 12. This will result in the even distribution of impact loads applied to the ring 28 and subsequently transferred to the bumper support 24.

With the rear carrier guide 22 of the present invention and its ability to swivel, a line drawn through the centers of the ring 28 and the circle defined by the bumper support 24 will tend to remain aligned with the centerline of a track in a track system, and will remain approximately tangent to the centerline of a track as it makes a curve. The positions of the pallet as it makes the turn shown in FIG. 4 are shown by the progression of the pallet as depicted by the pallets 15a, 15b and 15c.

FIGS. 5 through 11 are intended to clearly depict the structure of the three components of the rear carrier guide 22. The bumper support 24, as shown in FIGS. 5 and 6, include a smooth circular lower disk 25 with a smooth bottom surface 27. Extending upwardly from the disk 25 is a crescent-shaped formation 44 which defines an arcuate abutment surface 45. The pin 32 is staked firmly into a bore formed on the upper surface of the crescent-shaped formation 44. A D-shaped center support 50 also extends upwardly from the disk 25. A boss 40 extends upwardly from the upper surface of the center support 50, and has a threaded bore 41 formed centrally therein. The boss 40 is disposed centrally with respect to the disk 25. The boss 40 is dimensioned to fit closely but freely within the aperture 29 which extends through the upper plate 26. The upper surfaces of the center support 50 and the crescent-shaped formation 44 are bearing surfaces which slide when in contact with the undersurface of the upper plate 26.

FIGS. 7 and 8 show the urethane ring 28 which is an annular ring having a relatively square cross-sectional shape. The ring 28 fits closely within the space or channel 43 defined by the arcuate abutment 45 and the center support 50. The offset mounting arrangement represented by the crescent-shaped formation results in the rear carrier guide 22 having four points of contact (as shown in FIG. 4) when the rear carrier guide 22 is disposed within the track 12. A ring made of urethane elastomer has been found to perform best, because of frictional wear resistance and other properties, such as its resilience and ability to resist exposure to chemicals that adversely affect other elastomers.

FIG. 9 shows the details of the upper plate 26. The bar 42 extends upwardly from the upper surface of the upper plate 26. The bar 42 is shaped to fit snugly within a similarly shaped recess on the underside 19 of the pallet 15 to prevent relative rotation of the upper plate 26 and the pallet 15. The underside of the upper plate 26 is smooth and provides a bearing surface against which the upper surface of the center support 50 and the crescent-shaped formation 44 may slide. The slot 30 forms a space in which the pin 32 carried by the crescent-shaped formation 44 moves as the bumper support 24 and the upper plate 26 undergo relative rotation, i.e., as a pallet makes a turn in a track system.

Figure 11:
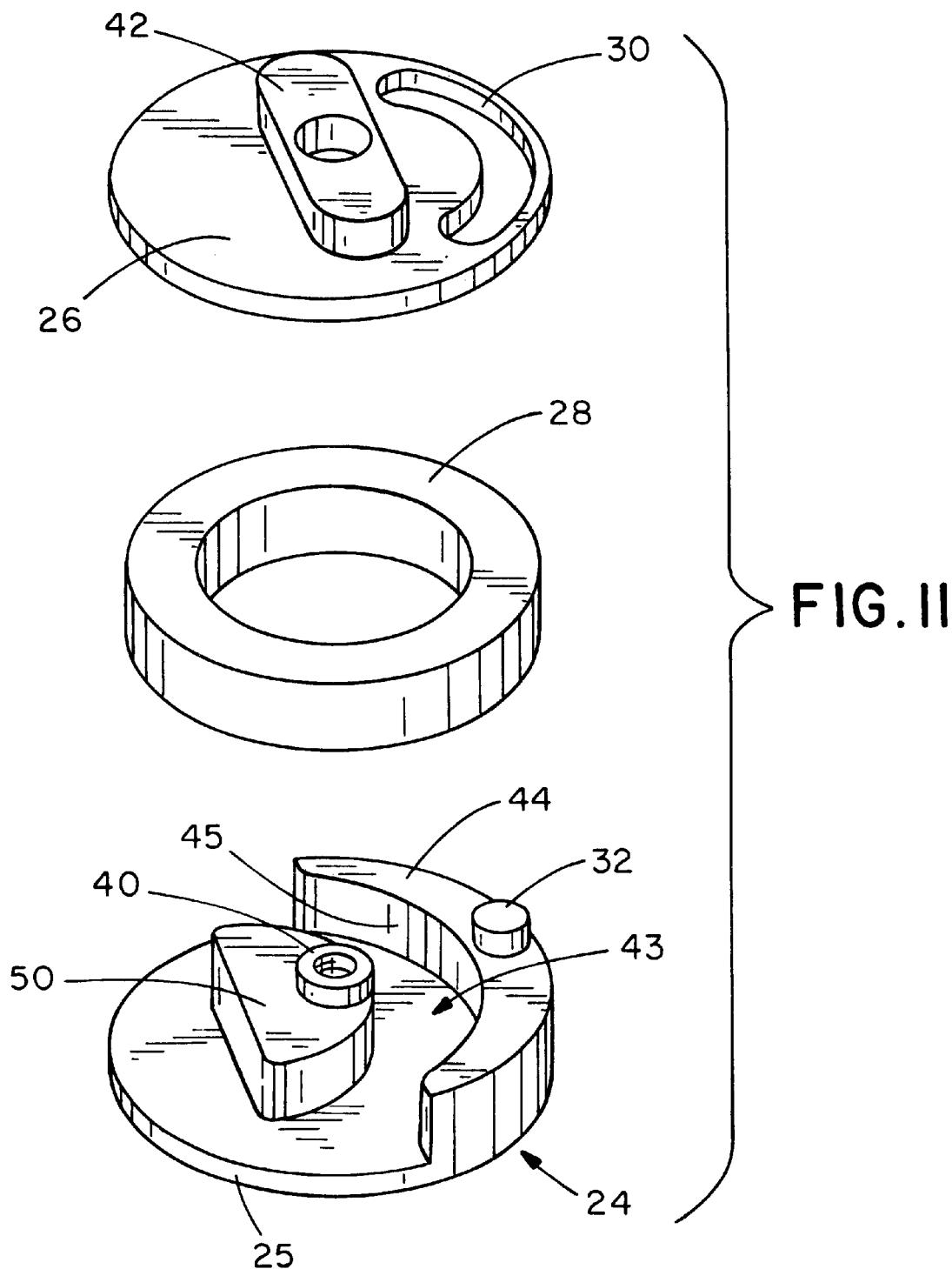
FIG. 11 is an exploded perspective view of the component of a bumper used on the rear of a carrier of the present invention.

FIG. 11 is an exploded view of the three components which comprise the rear carrier guide 22. A portion of the ring 28 fits into the channel 43, and the height of the ring 28 is slightly less than the height of the arcuate abutment 45 and the height of the center support 50. The upper plate 26 fits over the combination of the ring 28 and bumper support 24. The boss 40 fits into the aperture 29 which extends through the upper plate 26 to locate the upper plate relative to the upper support 24. Once the three components shown in FIG. 11 are assembled, the rear carrier guide 22 is mounted to the underside 19 of the pallet 15, and the shouldered bolt 34 is inserted into the recess 36 on the upper surface 18 of the pallet 15. The bolt 34 extends through the through-hole 38 in the pallet 15 and through the aperture 29 in the upper plate 26. The underside of the shoulder 35 of the bolt 34 is tightened against the upper surface of the boss 40 which extends upwardly from the center support 50. The dimension of the through-hole 38 is slightly less than the length of the shoulder 35 so that the head of the bolt 34 does not grip the bottom of the recess 36. Rather, the bolt 34 rotates freely within the recess 36 and the through-hole 38 as the bumper support rotates relative to the upper plate 26 and the pallet 15.

Because the bottom surfaces of the glide plate 21 and the carrier guide 22 engage moving track segments, the ability of those surfaces to withstand wear resulting from such service is important. Thus, the glide plate 21 and the bumper support 24 are preferably made of hardened steel.

Figure 12:
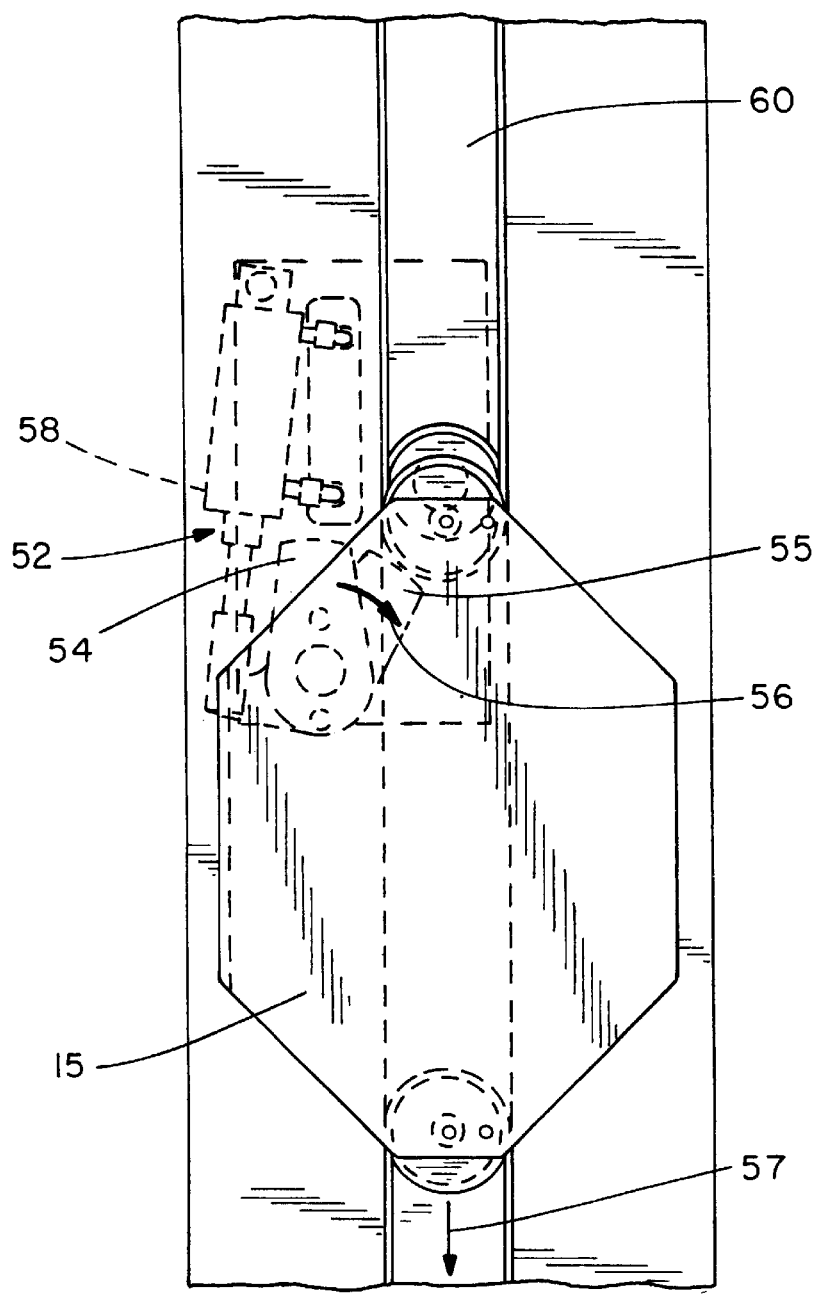
FIGS. 12 and 13 are plan and end views, respectively, of a pallet and track combination showing a pallet of the present inventions being stopped by a remotely actuated pallet stop assembly.
Figure 13:
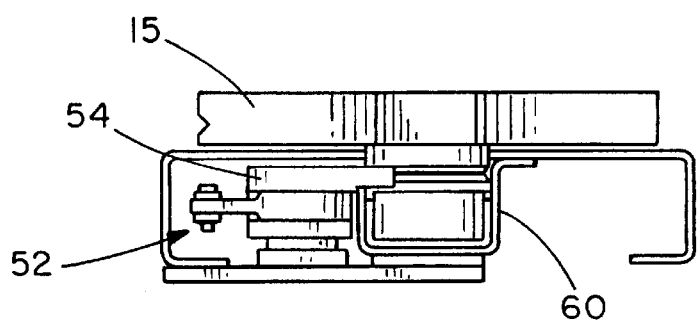

FIGS. 12 and 13 are top and end views, respectively, of a carrier disposed in a track at a work station. Movement of the pallet 15 is selectively stopped at a pallet stop assembly 52. The pallet stop assembly 52 includes a pivoting finger 54, which is moved into and out of an interference position 55 (shown in dotted lines in FIG. 12), as indicated by the arrow 56. A piston and cylinder assembly 58 is connected to one end of the finger 54. The assembly 54, including the actuation of the piston and cylinder assembly 58 may be pneumatically controlled, although other ways of causing movement of the finger 54 into and out of the interfering position 55 are feasible, such as by use of an electric motor. A second arrow 57 shows the direction of pallet flow along the track 60. The bumper ring 28 of the present invention carried by the rear or trailing end of the pallet 15 limits the back pressure in the track, i.e., the transfer of forces in the direction opposite to the direction of arrow 57 which results from the impact caused by one pallet encountering a stopped pallet. The lateral expansion of the ring means that impact forces are transferred into the track structure, rather than being passed from pallet to pallet. This means that the finger 54 will not experience repeated heavy impacts as a result of pallets bumping one another and forces being transferred from pallet to pallet along the track.

Although only one preferred embodiment of the present invention has been illustrated and described, it will at once be apparent to those skilled in the art that variations may be made within the spirit and the scope of the invention. Accordingly, it is intended that the scope of the invention be limited solely by the scope of the hereafter appended claims and not by any specific wording in the foregoing description.

What is claimed is:

1. A carrier in combination with a track system having at least one track comprising:

a pallet, a rear bumper support and a bumper ring, said bumper support being mounted to a rear portion of said carrier in a manner such that said bumper support may swivel relative to said pallet.

2. A carrier in accordance with claim 1 wherein:

said bumper support is moveable in a swivel plane relative to said pallet, said swivel plane being parallel to a plane defined by an upper surface of said pallet.

3. A carrier in accordance with claim 1 wherein:

said carrier includes a swivel limit, said limit including a pin and a slot, said slot being carried by said carrier, said pin being carried by said bumper support, and said pin being disposed on said slot, ends of said slot providing stops which contact said pin whereby swiveling motion of said support relative to said carrier is restricted.

4. A carrier in accordance with claim 1 wherein:

said bumper support includes a curved vertical abutment formed by an arcuate recess in an upper surface of said bumper support, a portion of said bumper ring fitting said arcuate recess.

5. A carrier in accordance with claim 4, wherein:

said bumper ring and said bumper support are generally circular and equi-diametrical, and said bumper ring being supported in a position relative to said bumper support such that outer edges of bumper ring are adjacent to an inside wall of said track in said track system at a first set of points, and outside edges of said bumper support are adjacent to said inside wall at a second set of points, said first and second sets being offset with respect to one another along a longitudinal axis of said track, whereby compression of said bumper ring expands said bumper laterally into engagement with said track to cause a braking action.

6. A carrier in accordance with claim 1 wherein:

said bumper support is disk-shaped and has a smooth lower surface for engaging a moveable conveyor moving along a track in said track system, said bumper support having a crescent-shaped lateral support extending upwardly at an edge of said bumper support, a central lateral support disposed in a central area of said bumper support, said crescent-shaped lateral support and said central lateral support forming an arcuate recess in an upper surface of said bumper support, said recess being shaped to receive and support an arcuate segment of said bumper ring.

7. A track system comprising at least one track section with a central channel and a moveable conveyor disposed at a bottom of said channel, a plurality of carriers moveable along said track section, each carrier having a front and a rear bumper attached to said carrier and extending into said channel, said channel having vertical walls extending above said conveyor, said walls providing directional guidance for said front and rear bumpers, a bumper ring carried by one of the bumpers on each carrier, said bumper ring being supported laterally by a concave vertical surface, whereby lateral impact forces applied to said bumper ring are distributed to said concave vertical surface, said bumper ring and the bumper carrying said bumper ring forming a bumper assembly, said bumper assembly being pivotably connected to said carrier, said bumper assembly being moveable in a horizontal plane relative to said carrier.

8. A track system in accordance with claim 7 wherein:

said bumper in bumper assembly includes a lower plate with an upwardly extending boss, and an upper plate with an opening, said boss extending into said opening, said upper plate being non-rotatably connected to said carrier, and said lower plate being rotatable relative to said upper plate and said carrier.

9. A track system in accordance with claim 8 wherein:

said lower plate includes an upwardly extending crescent-shaped formation and an upwardly extending center support carrying said boss, an arcuate space being formed between said crescent-shaped formation and said center support, said bumper ring being partially disposed in said space, said crescent-shaped formation having a concave vertically oriented surface for engaging and outer surface of a portion of said bumper ring, said upper plate having an arcuate slot formed on a lower surface thereof, said lower plate having a protrusion affixed thereto and shaped to fit within said slot, ends of said slot providing limits on pivoting motion of said lower plate relative to said upper plate.

* * * * *